United States Patent Office 3,209,554
Patented Oct. 5, 1965

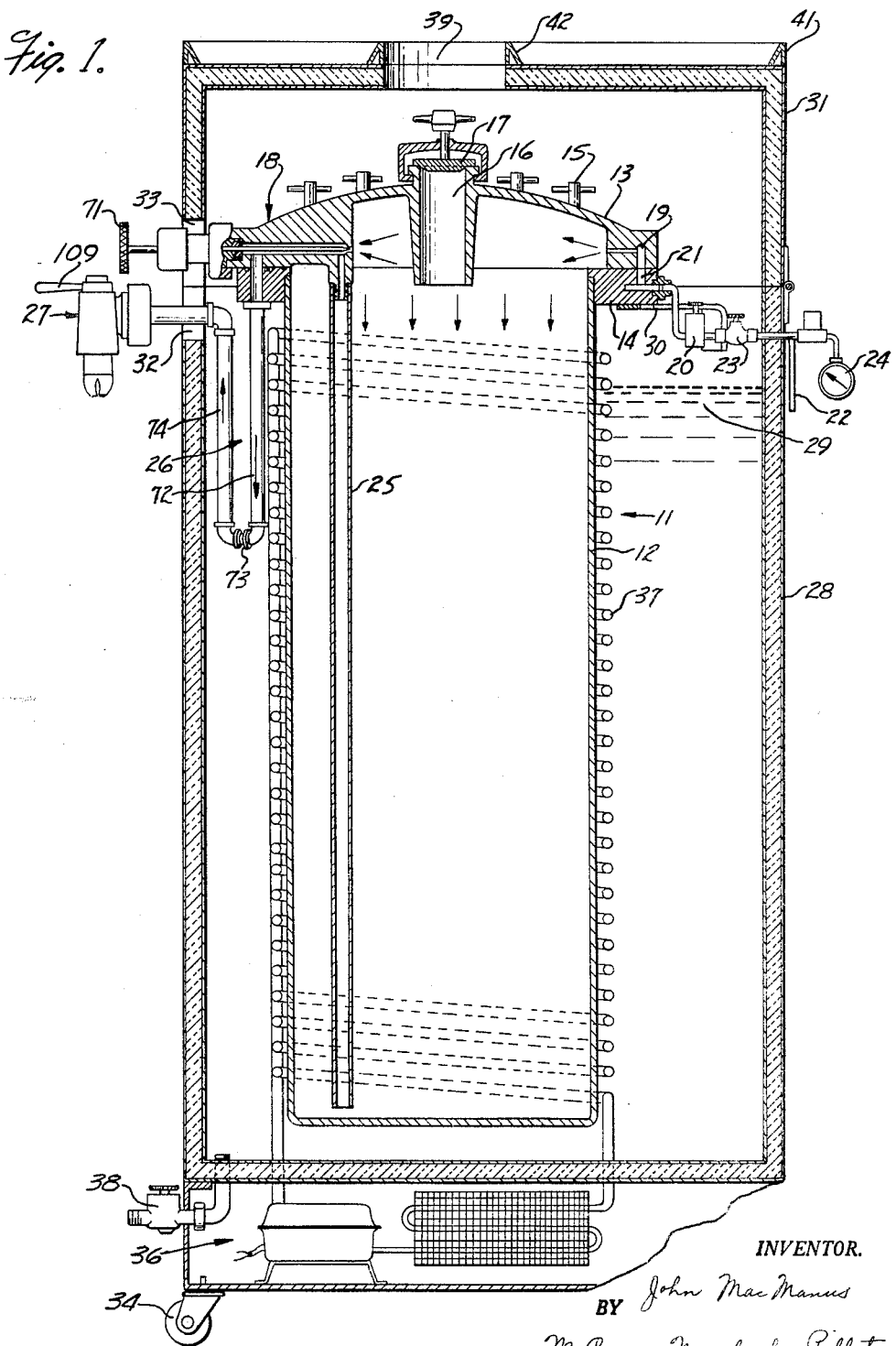

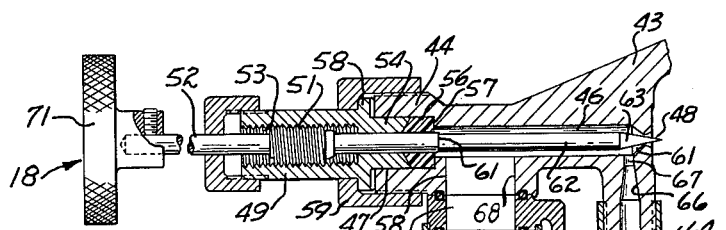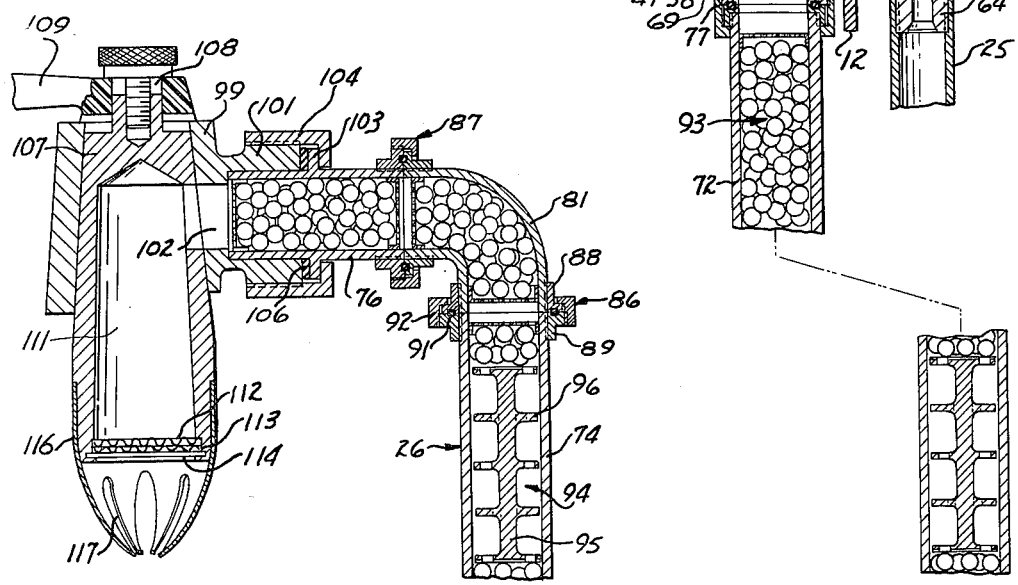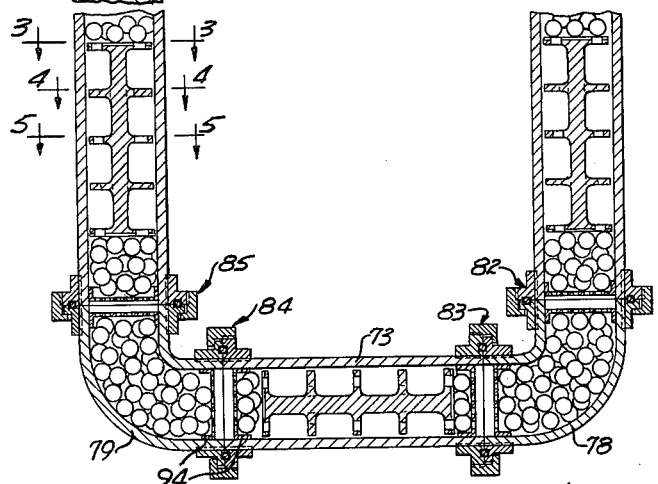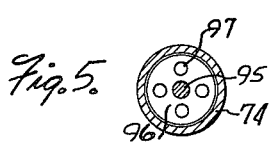

3,209,554
WHIPPING APPARATUS
John MacManus, 143—16 23rd Ave., Whitestone, N.Y.
Filed Sept. 27, 1962, Ser. No. 226,557
10 Claims. (Cl. 62—306)

This invention relates to apparatus for whipping or emulsifying food products, though not necessarily limited to such products, and particularly to a whipping apparatus utilizing the principle disclosed in United States Letters Patent No. 1,889,236, hereinafter referred to as pressure vessel whippers.

An important use of such whippers is to produce whipped products such as whipped cream, imitation whipped cream and toppings for application to food products such as cakes, pies and the like at commercial bakeries wherein the topping must remain stiff and stable for relatively long periods of time and under adverse conditions and wherein maximum expansion is frequently desired and high production rate is a significant factor.

So far as I am aware pressure whippers of the type herein contemplated have not been successfully employed to meet large commercial requirements in this country or abroad. Among the important reasons for this lack of commercial success is the fact that the product produced thereby has in general been unsatisfactory in that the flow rates of finished whipped product have been too low. The process of whipping consists in the main, in incorporating and dispensing into the liquid small bubbles of gas to cause expansion of the product, the amount of this expansion being commonly referred to as overrun. Thus, if the whipped product occupies twice the space of the original liquid, it is said to have 100 percent overrun. The stability of the whipped product, particularly under high overrun, is in a large measure dependent upon the size of the gas bubbles and the uniformity in size and distribution in the continuous liquid phase.

While whippers of the pressure vessel type have been used in the past with some degree of success by small bakers in foreign countries for producing whipped cream from natural cream, they have been inadequate, because of the equipment construction, for the production of whipped products from creams other than animal fat creams because of coarse product structure, instability and the likelihood of collapse of the product and the whippers have not been acceptable in this country for sanitary reasons and by reason of very low flow rates.

In the past, it has been the conviction that the particles constituting the disbursing medium in apparatus of this character, should be small in size (the smaller the better) and irregular in shape to form the preferred flow path for the liquid and gas and thereby provide the necessary aeration. The virtually unanimous acceptance of this concept by those concerned with apparatus of this sort has, I believe, been responsible for the fact that there has been no significant improvements in whippers of this character in many years and the apparatus has never assumed any material commercial success. An important object of the invention is the provision of an apparatus of the class described capable of producing whipped products of substantially uniform consistency at a delivery rate sufficient to enable its satisfactory use in large commercial establishments and with continuous decorating machines.

A further important object is to provide a pressure whipper in which the food material is stored and dispensed under sanitary conditions such that the parts in contact with the food materials may be largely cleaned in place without dismantling and in which dismantling for cleaning is only necessary at relatively infrequent intervals.

Another object of the invention is to provide a whipping apparatus of the class described wherein the surfaces of the apparatus exposed to contact with food materials have smooth surfaces substantially free of cracks, openings and irregularities to minimize the points for lodgement of food material where bacterial growth may occur and to facilitate effective cleaning and sterilization of the apparatus.

Another object of the invention is the provision of a whipping apparatus of the pressure vessel type of improved construction capable of producing more stable whipped products.

A further object of the invention is the provision of a whipper of the type described which is capable of producing greater overrun of stable product than heretofore possible.

A still further object is to provide a whipper of the type described capable of producing stable whipped products from liquid raw materials such as animal fat cream or vegetable fat cream which have high overrun potential.

Another object is to provide a whipper of the type described having novel form of dispensing nozzle for comminuting or breaking up larger air bubbles as the product passes through the nozzle, allowing the product to be dispensed in a smoother form without adversely affecting the stability of the product.

Other objects and advantages will become apparent from the following description of the accompanying drawings in which:

FIG. 1 is a vertical section, in part diagrammatic, through a whipper embodying my invention.

FIG. 2 is a sectional view through the expansion valve, whipping tube, and dispensing nozzle.

FIG. 3 is a view on the line 3—3 of FIG. 2.
FIG. 4 is a view on the line 4—4 of FIG. 2.
FIG. 5 is a view on the line 5—5 of FIG. 2.

The illustrated embodiment of the invention includes a pressure vessel indicated generally by the numeral 11 having a tank portion 12 and a cover portion 13. The tank is provided with an annular flange 14 to which the cover is attached by studs 15 spaced around the flange. The cover has a central tubular filling opening 16 closed by a clamped cover plate 17. The apparatus includes an expansion valve indicated at 18 and best shown in FIG. 2, the body of which is, in this instance, formed integral with the cover 13. The cover and flange are provided with registering channels 19 and 21 for supplying gas under pressure to the interior of the vessel as from an air compressor and suitable filters (not shown) by way of tubing 22 and valve 23, a pressure gauge 24 being desirably provided in the line. A manually operated pressure relief valve 20 is provided to permit bleeding of pressure from within the vessel by the closing of valve 23 and the opening of valve 20.

A liquid inlet conduit in the form of a tube 25 disposed within the vessel extends from a point adjacent the bottom of the vessel to the expansion valve, and a whipping tube 26, outside the vessel, of depending U-shaped configuration, has one end communicating with the expansion valve through flange 14, the opposite end thereof being connected to a dispensing nozzle 27.

The pressure vessel, whipping tube, and nozzle are supported as a unit on transverse brackets 30 extending from the sides of an insulated cabinet 28 having a hinged cover 31. Slots as indicated at 32 and 33 are provided in the sides of the cabinet and cover so that by swinging the cover to an open position and breaking the air line at the valve 23, the pressure vessel and associated parts may be removed from the cabinet as a unit for cleaning or repair. The pressure vessel and whipping tube are largely surrounded by a cooling liquid as indicated at 29, held in the insulated cabinet 28. The cabinet may suitably be supported on casters 34 and carry a conventional refrigeration unit indicated diagrammatically at 36 for supplying cooling refrigerant to a cooling coil 37 within the cabinet, supported in spaced relation to the pressure vessel. A spigot 38 facilitates draining the cabinet when necessary. The cover 31 has a central opening 39 for access to the central filling opening 16 and enabling the vessel to be filled by means of a funnel or the like. The cover also has raised annular ribs about its periphery and about the opening 39 as indicated at 41 and 42 for the purpose of confining any spillage and preventing it from running down into the cabinet or down the outer sides.

Referring to FIG. 2, the expansion valve includes a body portion 43 integral with the cover having an externally threaded boss 44, a bore 46, a counterbore 47 and a gas inlet port 48. A sleeve member 49 has a portion internally threaded as at 51 and carries a valve stem 52, externally threaded at 53 to cooperate with the sleeve to advance and retract the stem. The sleeve 49 also has a packing gland comprising a plug portion 54 and a gasket 56 of soft plastic material, received within the counterbore 47, the gasket being retained against a shoulder 57 by a flange 58 on the sleeve and a retainer 59 threaded onto the boss 44. The stem 52 has a shoulder 61 providing a portion of reduced diameter toward the inner end thereof which forms a needle 62 of the needle valve, the reduced portion being substantially smaller than the bore 46 which forms the expansion chamber of the valve. The end of the needle is tapered as at 63 and is complementary to a narrow seat forming the junction between the chamber and the gas inlet port 48. The body of the valve also has a threaded boss 64 for attachment of the tube 25 and a tapered bore 66 which forms the liquid inlet 67 to the valve. It should be noted that the bore 46 terminates in a conical end, having its apex at the inlet 48 and the inlet 67 is located in the side of the bore directly adjacent the conical end in the area of maximum reduction in the velocity of the gas entering the chamber through the port 48, whereby the expansion valve forms an adjustable ejector which controls not only the rate of flow of air but also of the liquid. Consequently, liquid is drawn up from the vessel through the inlet port in response to the corresponding reduction in pressure and is immediately agitated to a foamy mass or stream. The combined stream of gas and liquid passes along the stem to an outlet port 68 communicating with a passage 69 through the flange 14, a suitable gasket being interposed therebetween, and then passes to the whipping tube 26. The rate of flow of the gas and consequently to a substantial degree the ratio of gas to liquid and also the overrun is determined by the setting of the stem 52 which carries a knurled and graduated knob 71 for purpose of adjustment. The reduction in pressure in the expansion valve and the consequent expansion of the fluid results, of course, from the fact that as shown in FIG. 2, the outlet port 68 and the free area of the bore 46 have a flow area greater than the combined flow areas of the gas inlet port 48 and the liquid inlet 67.

The whipping tube 26 preferably comprises a number of sections as for example, the sections 72, 73, 74 and 76. The section 72 is connected to the flange 14 in communication with passage 69 by a suitable coupling 77 and the sections 72, 73, 74 and 76 are interconnected by elbows 78, 79 and 81 and by suitable couplings 82 through 87. While this specific form of these couplings is not critical, they should be so constructed as to be readily disconnectable one part from the other and so that the ends of the respective elements which they retain in position are brought into intimate contact so as to provide a minimum crack or space for the accumulation of material therebetween. One suitable form shown in the drawings which comprises two threaded members such as 88 and 89 threaded onto the ends of the respective sections of the tube and having provision for an O-ring seal 91 therebetween. A retainer collar as indicated at 92 is threaded onto the coupling member 89 and has a flange bearing against a face of the coupling member 88 so as to draw the parts into intimate engagement with rotation of the member 92. The tube 26 should be a smooth walled tube preferably of uniform internal diameter, or at least free of abrupt changes in shape or size so as to present a minimum of points where material may lodge and so that the tube may be readily cleaned. Disposed within the tube 26 are a multiplicity of imperforate balls indicated generally by the numeral 93, which may substantially fill the tube from end to end, if desired. These balls are preferably of glass but may be formed of any inert material capable of providing a smooth substantially spherical non absorbent surface. The balls are retained in the tube sections by means of screens formed of imperforate metal plates disposed in the ends of each of the tube sections as indicated at 94, the plates having a friction fit in the ends of the tube sections. However, I have found that with certain materials and under certain conditions, a more uniform texture may be obtained by introducing into the whipping tube at spaced points one or more deflector elements such as indicated at 94. These elements may be formed of any material which is non absorbent and which will present a smooth surface such as molded synthetic resin or stainless steel. Essentially, these elements consist of a cylindrical stem 95 having a series of disks 96 formed thereon in this instance, five in number, these being of uniform diameter and of such size as to be snugly received within the tube but capable of being freely removed from the tube for cleaning. Each of these disks has a plurality of holes therethrough as indicated at 97 in FIGS. 3 through 5. The holes in adjacent disks are offset as will be apparent from a comparison of these figures so that the material passing therethrough is required to take a circuitous path. The openings in the two end disks at least are smaller than the ball sizes so that the balls may not pass therethrough and the two end disks of each element are provided with upstanding cross ribs as shown at 98 for the purpose of preventing the balls from seating across the openings in these disks and thereby sealing the openings.

The tube section 76 in this embodiment passes through the slot 32 in the wall of the cabinet and the nozzle 27 is attached to its outer end. The structure of this nozzle is best shown in FIG. 2 and includes a body 99 having an attachment flange 101 for connection to the tube and provided with an inlet passage 102. The tube may suitably have an annular flange 103 for engagement by a nut 104 threaded onto the attachment flange for drawing the annular flange 103 against the flange of the nozzle, a gasket 106 being interposed therebetween. A plug 107 is rotatably disposed within the body and has a stem 108 to which a handle 109 is attached. The plug extends beyond the body to provide space for an internal expansion chamber 111, the lower end of the chamber being covered by super imposed screen disks 112 and 113, the screen 113 being of finer mesh than the screen 112 to provide a labyrinth to facilitate breaking up of air bubbles. The screens are held in place against suitable shoulders by a snap ring 114. Disposed about the lower end of the plug is the cone like nozzle tip 116 having radially positioned exit slots 117. The chamber 111 may, optionally, be filled with balls such as the balls 93, which, in some instances may further facilitate breaking up of larger air bubbles if necessary.

The structure herein described is such that a whipped product of widely varying characteristics may be produced and the discharge flow rate may be varied by varying the adjustment of the needle valve and the dimensional characteristics of the whipping tube and the balls.

By way of example, one structure capable of producing the results of the invention includes a pressure vessel having a capacity of about 30 pounds of the liquid to be acted upon, though the size of the pressure vessel is solely a matter of convenience. The whipping tube has a substantially uniform internal diameter of about ⅞ inch and is approximately 30 inches in length. The air pressure applied to the top of the pressure vessel is approximately 100 pounds per square inch. Utilizing throughout a single whippable food material in the vessel, if the tube is filled with balls of approximately three millimeter diameter, the maximum discharge rate of whipped product will be about one pound per minute. Using balls of four millimeter diameter, the maximum discharge rate of whipped product obtainable through the nozzle will be about one and one-half pounds per minute. When balls of five millimeter diameter are employed, the maximum discharge rate increases to about three and one-half pounds per minute and with six millimeter balls to about five pounds per minute. Under the conditions described, the maximum flow rate in pounds per minute is obtained when the needle valve is set to admit a minimum of gas to the expansion chamber or in other words, when the flow rate of gas is low. The result is that the discharge at the nozzle contains a high proportion of liquid to gas and the stiffness of the product is at a minimum because of the lower expansion and yet a high percentage of gas is incorporated in the product. As the flow of gas is increased, the product becomes stiffer is consistency and the discharge rate in terms of weight decreases. Between these two limits, an optmium is reached where the most desirable product is produced. At the lower flow rates of gas, the product has a minimum of overrun and the emulsion is apt to be wet and unstable. On the other hand, at the higher flow rates of the gas valve setting, the product becomes extremely stiff so that the flow rate is greatly impeded and the resultant product lacks uniformity in structure and incorporates relatively large air bubbles. Furthermore, because of the extreme expansion, the product tends to dry out rapidly when applied to bakery goods and for that reason is apt to be undesirable.

When the length of the tube is decreased, all other factors remaining the same, the discharge rate in terms of weight increases but the stiffness of the product decreases. Within limits this may be compensated for by decreasing the size of the balls so as to decrease the flow area through the whipping tube thus providing smaller interstices between the balls but this in turn reduces the discharges rate. In practice, I find an optimum range for most practical purposes, using emulsifiable liquid such as referred to, is provided by a tube between about twenty and thirty inches long having an internal diameter in the region of ⅞ of an inch filled with balls of about five millimeter diameter. The diameter of the tube can be varied within limits but should be large enough so that there are a substantial number of balls disposed across the cross-sectional area of the tube. This, when the tube length is at a minimum in the above range, the smaller balls may be employed with adequate flow rate and dispersion and, as the tube length is increased to about thirty inches, the size of the balls may be increased. I have found that for practical purposes, the range of ball sizes may run from a minimum of three millimeters in diameter to maximum of eight millimeters. I have found that one of the reasons for the commercial failure of prior machines was the false concept that the whipping element held within the tube should be as small as possible in order to get a proper and adequate whipping action. This is false and, when the particles sizes go below about three millimeters in diameter, no improvement in the whipping action occurs and the very small particles obstruct the flow of liquid and gas through the whipping tube and consequently reduce the output. On the other hand, with balls which fall within the range specified, highly improved flow rates are obtained and adequate whipping action can be obtained by adjustment of the relative proportions of air and gas. The gas pressure employed is preferably between about ninety pounds per square inch and one hundred twenty five pounds per square inch. Though higher pressures may be used, there appears to be little advantage in doing so because the higher pressures require more expensive construction and but little if any improvement in the flexibility of operation or in the flow rate or characteristics of the product results.

While I cannot confirm with certainty the theory underlying the reasons for improved operation of this device, I believe from my experiments, that it results from a number of factors. I believe that the improved operation at least in part results from what might be termed the self regulating intermixing of the liquid and gas in the needle valve. When the needle valve is opened, the differential in the pressures moves the liquid up the tube 25 into the mixing chamber 46. As the liquid enters this chamber, it is impinged or struck by the stream of rapidly flowing air entering from the port 48 so that a violent and thorough intermixing is obtained which, I believe, initiates the emulsification process. I believe also that the size of the balls is a significant factor in contributing to the improved operation and the fact that the balls are solid spheres. It is believed that balls within the ranges specified are such as to provide the proper and desirable interstices between the balls so that a maximum flow rate is obtained consistent with the proper and adequate disruption of the air bubbles as the two pass through the whipping tube. With the construction shown and described, there is a gradual reduction of pressure and expansion of the product from the inlet to the nozzle. Because of this expansion, it is necessary that the relative flow capacities as between the inlet tube 25 and the whipping tube 26, be at least three to one since at its optimum, the whipped product as it reaches the nozzle should occupy approximately three times the space of the entering liquid. find that provided my methods are followed that the pressure on the material at the nozzle is relatively low probably not normally exceeding about five pounds and consequently, there is a pressure drop as between the inlet and the outlet equivalent to this change. I find further improved results are obtained by having the flow capacity of the nozzle chamber 111 somewhat greater than that of the whipping tube so that further expansion occurs as the whipped product enters this chamber. At this point, with the indicated expansion, there may be some separation of large air bubbles which will be segregated from the product as it moves out of the nozzle and will therefore not be occluded in the whipped product as it is used.

While the deflectors 94 are not essential to the operation of the apparatus and the whipping tube can be completely filled with balls, I find that a somewhat more uniform product can be obtained by the use of these deflectors. It is my belief that these act to change the character of the flow as it moves through the whipping tube and to possibly break up the larger air bubbles as the mixture reaches the spaces between the disks so that the air is again forced through the small openings 97 into intimate contact with the balance of the liquid, thereby producing a somewhat more uniform whipped product.

An important, if not critical, but critical for the Western Hemisphere, factor in the invention is the provision of a whipping tube having a smooth and preferably uniform diameter inner surface, together with round imperforate balls having smooth outer surfaces the size of the balls being proportioned to provide a tortuous labyrinth for the continuous entraining of the gas with the liquid. One of the serious objections to whiping apparatus of the past has been the failure to meet sanitary requirements because of the tendency to unsanitary accumulations in the whipping tube and the difficulty of properly cleaning the same without the time consuming task of dismantling the unit after each use and in some cases, the complete replacement of the whipping particles. This is because the common whipping particles in commercial use have consisted of beads in the form of small short cylinders having a central opening. These whipping particles have not only served to greatly retard the flow rates in aparatus of the past but they have rendered such aparatus almost impossible of thorough cleaning of such that frequently the charge of beads had to be replaced because of the difficulty of cleaning and the accumulation of deposits in the holes of the beads thus they are considered unsanitary under modern Board of Health laws. I have therefore solved this problem by using imperforate balls.

I have found that with the construction herein described the unit can be maintained in continuous use for periods in excess of a month without material increase in the bacterial count of the product. Because of the smooth surfaces of the tube and the balls, there is little tendency for the material to cling to either of these parts. Also the balls, being round and smooth, have a certain amount of rolling movement with respect to each other and with respect to the wall as the material passes through the tube so that the balls and the tube are largely self cleaning. Furthermore, the tube and balls can be effectively cleaned without dismantling the whipping tube. This is in large measure due to the fact that the inner wall of the tube is smooth and the balls are smooth and imperforate. Consequently, when a cleaning solution is introduced into the pressure vessel and forced under pressure, through the whipping tube, there is a slight rolling movement of the balls which tends to scour the balls on the walls of the tube as the cleaning solution passes through.

It is of course necessary upon occasion to dismantle the aparatus and thoroughly clean all of the parts. The design is such that the pressure vessel, the whipping tube and nozzle can be removed from the housing as a unit. Furthermore, because of the nature of the couplings 82 through 87 the various sections of the whipping tube can be quickly disconnected. The retainer plates 94, having a friction fit within the tube sections can be readily removed and the balls in other parts scoured in the usual fashion. In addition, the tube sections having smooth walls can be readily cleaned by means of brushes.

In view of the factors discussed, the apparatus has met with general approval by sanitation authorities and is meeting with considerable commercial success.

While I have thus described and illustrated the specific embodiment of the invention, numerous alterations and changes can be made within the scope of the appended claims.

I claim:

1. A whipping apparatus for whipping food products such as animal or vegetable fat cream comprising a pressure vessel for holding a whippable liquid, means for applying gas pressure in excess of about 90 p.s.i. to the vessel above the liquid, a dispensing nozzle, a whipping tube outside the vessel connected at one end to the nozzle, an expansion valve comprising a body having a gas inlet port in communication with the interior of the vessel above the liquid, an expansion chamber in communication with said inlet port, an outlet from said chamber remote from said gas inlet port in communication with the opposite end of said whipping tube and a needle valve member for closing and for adjustably controlling the flow of gas through the gas inlet port, a liquid inlet conduit having one end disposed at a low point in said vessel and the other end connected with the expansion chamber adjacent said gas inlet whereby liquid is caused to flow to said chamber for intermixing with the flow of gas to said chamber through the gas inlet port to produce a frothy mixture of gas in a liquid phase in said chamber for passage through said outlet to the whipping tube, said outlet and whipping tube having a flow area substantially greater than the flow area of said liquid inlet, and a multiplicity of smooth imperforate round balls in said whipping tube disposed in intimate contact with the tube and with each other filling the tube through at least a portion of the length of the tube to provide a multiplicity of interstices therebetween crosswise and lengthwise of the tube for the passage of and intermixing of the liquid and gas to produce a whipped product.

2. A whipping apparatus for whipping food products such as animal or vegetable fat cream comprising a pressure vessel for holding a whippable liquid, means for applying gas pressure to the vessel above the liquid, a whipping tube outside the vessel, an expansion valve comprising a body having a bore provided with gas inlet at one end thereof in communication with the interior of the vessel above the liquid level and an outlet from the bore remote from the gas inlet port communicating with said whipping tube, said bore forming an expansion chamber, and a needle valve extending longitudinally of the bore operable to close and to adjustably control the flow of gas through the gas inlet port, a liquid inlet conduit having one end disposed at a low point in said vessel and the other end connected with the bore adjacent the said gas inlet whereby liquid is caused to flow to said chamber for intermixing with the flow of gas to said chamber through the gas inlet port for intimate mixing therein to produce a frothy mixture of gas in a liquid phase in said chamber for passage through said outlet to the whipping tube, said outlet and whipping tube having a flow area substantially greater than the flow area of said liquid inlet for expansion of the mixture in response to drop in pressure during passage through the valve and whipping tube and a multiplicity of smooth imperforate round balls in said whipping tube filling the tube through at least a portion of the tube to provide a multiplicity of interstices therebetween crosswise and lengthwise of the tube to progressively reduce the size of the air bubbles as expansion of the mixture proceeds.

3. The combination of claim 2 wherein the whipping-tube comprises a tubular conduit of generally U-shaped configuration, the conduit comprising a plurality of straight sections and a plurality of elbows interconnected by couplings for ready dismantling, the conduit having a smooth non porous inner surface of substantially uniform diameter throughout a substantial portion of its length, said balls being packed in said portion, and a removable retainer screen at each end of each section for retaining the balls in position upon dismantling of the tube.

4. The combination of claim 2 wherein at least one deflector member is disposed in the whipping tube dividing the balls into groups, the deflector member comprising a central stem having a plurality of perforated disks thereon the outer edges of which snugly but slidably engage the inner surface of the tube, the perforations of each disk being circumferentially offset from the perforations of the immediately adjacent disks to provide a tortuous path for the passage of the combined stream of liquid and gas therethrough to change the flow pattern thereof and promote the whipping action.

5. The combination of claim 2 wherein the length of the whipping tube is between twenty and thirty inches.

6. The combination of claim 2 wherein the imperforate balls have a diameter of between three millimeter and eight millimeter.

7. The combination of claim 2 wherein the internal diameter of the whipping tube is at least four times the diameter of the balls, the length thereof is between twenty and thirty inches and the diameter of the imperforate balls is between three millimeter and eight millimeter.

8. The combination of claim 1 wherein said nozzle comprises a body, a rotatable plug in said body having a flow of greater capacity than the whipping tube cavity and a dispensing port, and a plurality of spreader screens disposed across said dispensing port.

9. The combination of claim 2 wherein the whipping tube comprises a tubular conduit of generally U-shaped configuration including vertically disposed legs and a horizontally disposed leg having a smooth non porous inner surface of substantially uniform diameter throughout a substantial portion of its length, one of said vertically disposed legs having its end connected to the outlet from said bore and extending downwardly therefrom whereby the mixture, on entering the whipping tube is first caused to flow downwardly.

10. A whipping apparatus comprising a pressure vessel for holding a whippable liquid, said vessel including a pressure tank and a cover removably attached thereto, means for applying gas pressure to the vessel above the liquid, an expansion valve on said cover comprising a body having a bore extending through the cover provided with a gas inlet port at one end thereof in communication with the interior of the vessel above the liquid level, a liquid inlet port in communication with the interior of the vessel at a low point therein, an outlet port from the bore remote from the inlet ports and disposed outside the vessel, and a needle valve extending longitudinally of the bore operable from outside the vessel to close and to adjustably control the flow of gas through the gas inlet port, a whipping tube disposed outside the vessel in communication with said outlet port, a multiplicity of balls snugly packed within said tube to form labyrinth for the passage of the combined stream of liquid and gas therethrough to effect intimate mixing thereof and produce a whipped product, an insulated cabinet having a cover, bracket means in the cabinet for supporting the pressure vessel in upright position, a refrigeration unit carried by the cabinet having cooling coils disposed within the cabinet in spaced relation to the pressure vessel and a cooling medium disposed within the cabinet about the pressure vessel and whipping tube for maintaining the contents in refrigerated condition, the side walls of the cabinet and cabinet cover having slots therein for the passage of the expansion valve and whipping tube to enable the pressure vessel, expansion valve and whipping tube to be lifted from the cabinet as a unit.

References Cited by the Examiner

UNITED STATES PATENTS

| 1,889,236 | 11/32 | Burmeister | 99—60 |
| 1,986,444 | 1/35 | McIntosh | 239—373 X |
| 2,514,107 | 7/50 | Trostler | 239—343 X |
| 2,654,585 | 10/50 | Heesen. | |
| 2,731,925 | 8/51 | Carvel | 251—310 |

FOREIGN PATENTS

| 1,151,224 | 1/58 | France. |

ROBERT A. O'LEARY, *Primary Examiner.*

MEYER PERLIN, *Examiner.*